United States Patent Office 3,345,343
Patented Oct. 3, 1967

3,345,343
POLYPIVALOLACTONE CONTAINING A NICKEL CHLOROBENZOATE
Raymond Frank Tietz, Wilmington, Del., assignor to E. I. du Pont de Nemours and Company, Wilmington, Del., a corporation of Delaware
No Drawing. Filed July 14, 1964, Ser. No. 382,641
9 Claims. (Cl. 260—78.3)

This invention relates to film- and fiber-forming compositions of polymeric 2,2-disubstituted propiolactones which have been modified for improved dyeability.

Fibers of polypivalactone and other polymeric 2,2-disubstituted propiolactones are valuable for the production of fabrics suitable for garments requiring only minimum care. However, a disadvantage associated with the use of these fibers up to the present time has been that the range of dyestuffs suitable for use with the polymers is narrow and the depth of dyeability normally realized is limited.

In accordance with the present invention, it has been found that markedly enhanced dyeability with chelatable dyes is exhibited by polymeric 2,2-disubstituted propiolactones containing a small amount of a nickel salt selected from the group consisting of nickel anthranilate, nickel 3-chlorobenzoate, nickel 4-chlorobenzoate and nickel 3,4-dichlorobenzoate.

The amount of nickel incorporated in the polymer, in the form of the salt, is in the range of about 0.05 to about 0.5 wt. percent nickel, the optimum concentration being about 0.1 wt. percent nickel. If desired, the nickel salt can be mixed with the monomer from which the polymer is prepared; preferably, however, the composition is prepared by incorporating the nickel salt in the polymer after the polymerization thereof.

It is of critical importance that the composition be prepared by incorporating in the polymeric 2,2-disubstituted propiolactone one of the nickel salts from the class defined above. Other nickel salts, including isomers of the above-mentioned nickel salts such as nickel 4-aminobenzoate or nickel 2,4-dichlorobenzoate, have been found ineffective in that the salts are leached from the fibers by the dyebath. In addition, discoloration or degradation of the polymer when it is held in the molten state at extrusion temperature is a severe problem with many nickel salts such as nickel benzoate or nickel stearate.

Polymeric 2,2-disubstituted propiolactones which may be used in accordance with the present invention are polyesters consisting essentially of recurring ester structural units of the formula

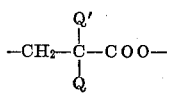

wherein Q and Q′ as more particularly defined below with reference to the lactone precursors are the same or different alkyl radicals containing from 1 to 4 carbon atoms which may contain chlorine substituents and which may optionally be joined by a carbon-to-carbon bond to form an alicyclic ring. Polymers of film- or fiber-forming molecular weight are readily prepared from the corresponding 2,2-disubstituted propiolactones, which have the formula

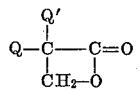

Typical 2,2-disubstituted propiolactones include pivalolactone ($Q=Q'=CH_3$), 2,2-diethylpropiolactone ($Q=Q'=CH_2CH_3$)

2-methyl-2-chloromethylpropiolactone ($Q=CH_3$, $Q'=ClCH_2$)

2,2-bis(chloromethyl)propiolactone ($Q=Q'=ClCH_2$), 2-methyl-2-ethylpropiolactone ($Q=CH_3$, $Q'=CH_2CH_3$), 2,2-dipropylpropiolactone ($Q=Q'=CH_2CH_2CH_3$), 2,2-dibutylpropiolactone ($Q=Q'=CH_2CH_2CH_3CH_3$), and 2,2-pentamethylenepropiolactone ($Q+Q'=CH_2CH_2CH_2CH_2CH_2$)

In the examples below, the term "inherent viscosity" is defined as the polymer property determined in accordance with the following relationship:

$$\eta_{inh} = \frac{\ln \eta_{rel}}{c.}$$

wherein the relative viscosity, $\eta_{rel}$, is calculated by dividing the flow time in a capillary viscometer of a dilute solution of the polymer by the flow time for the pure solvent, trifluoroacetic acid. The concentration (c.) used in the examples is 0.5 gram of polymer per 100 ml. of solution. An inherent viscosity of at least about 0.5 is desired for the polymers employed in this invention to be used in films.

The following examples will further illustrate the invention, although they are not intended as limitative.

EXAMPLE I

*Fibers of polypivalolactone modified with nickel 3,4-dichlorobenzoate*

A mixture of 3,600 g. of pivalolactone, 14,400 ml. of n-hexane, and 35 ml. of a one molar solution of tetrabutylammonium hydroxide in methanol is refluxed for 90 minutes with continuous stirring. The product recovered by filtration, polypivalolactone, has an inherent viscosity of 1.8 in trifluoroacetic acid at 30° C.

A sample of the polymer is mixed with nickel 3,4-dichlorobenzoate (0.15 wt. percent nickel, based on the weight of the polymer) and extruded at 256° C. from a spinneret having 15 orifices, each 0.23 mm. (0.009 inch) in diameter. The extruded filaments are passed through a vertical water-quench tube continuously fed by water maintained at 10° C. from a cylindrical pan surmounting the tube and maintained full of water, after which they are gathered into a yarn at a convergence guide. The yarn so formed is taken up by a roll at 730 meters per min. (800 y.p.m.) and then passed to a draw roll at 820 meters per min. (900 y.p.m.) for a draw ratio of 1.1×, after which the yarn is wound up. The drawn yarn, which has a denier of 2.7 per filament, is wound taut on the bobbin and heated for 4.5 hours at 175° C. The heat-set yarn is white in color and has a tenacity of 4.8 g.p.d., a break elongation of 91%, an initial modulus of 27 g.p.d., and a work recovery at 5% elongation of 80%.

A fabric woven from the heat-set yarn is dyed with a chelatable dye having the formula

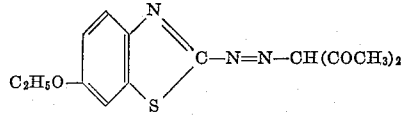

and prepared by diazotizing 6-ethoxy-2-aminobenzothiazole followed by coupling with acetylacetone. An amount of the dye equalling 3% of the weight of the fabric is pasted with five times the dye's weight of a 5% aqueous solution of an alkylaryl sodium sulfonate detergent and this is added to an aqueous solution of a petroleum sulfonate detergent (6 wt. percent, based on the weight of the fabric). The ratio of dyebath weight to fabric weight is 40 to 1. The fabric is inserted into the bath at room temperature and the bath is then brought to a boil. After one hour at the boil, the fabric is scoured with a nonionic detergent for one hour. The fabric is dyed a deep shade of red-orange which is sublimation-fast at 135° C.; whereas a control fabric of unmodified polypivalolactone is only tinted yellow, and sublimation of the dye is observed at 135° C.

The use of poly(α-methyl-α-chloromethylpropiolactone) in place of the polymer of this example yields structures that are dyeable with chelatable dyes.

EXAMPLE II

*Polypivalolactone film modified with nickel 3,4-dichlorobenzoate*

A sample of polypivalolactone prepared as described in Example I is mixed with nickel 3,4-dichlorobenzoate (0.3 wt. percent nickel, based on the weight of the polymer). A film melt pressed from the mixture is colorless. When dyed with the dye having the formula shown in Example I, the film is dyed a deep shade of red-orange.

For the purpose of comparison, the example is repeated, substituting nickel 2,4-dichlorobenzoate for nickel 3,4-dichlorobenzoate as the polymer additive. When the melt-pressed film is dyed under the same conditions, it adsorbs relatively little of the dye; however, the dyebath changes from its initial yellow color to a red color, indicating that the nickel 2,4-dichlorobenzoate is leached from the film into the dyebath.

EXAMPLE III

*Polypivalolactone modified with nickel 4-chlorobenzoate*

A sample of polypivalolactone prepared as described in Example I is mixed with nickel 4-chlorobenzoate (0.15 wt. percent nickel, based on the weight of the polymer). The polymer is then spun into yarn, drawn, and heat set in general accordance with the procedure described in Example I. The drawn yarn has a denier of 2.3 per filament. The heat-set yarn is white and has a tenacity of 4.4 g.p.d., a break elongation of 90%, an initial modulus of 30 g.p.d., and a work recovery at 5% elongation of 83%. Fabric woven from the heat-set yarn, when dyed with the dye having the formula shown in Example I, is dyed a deep shade of red-orange.

A film melt-pressed from polypivalolactone mixed with nickel 4-chlorobenzoate (0.3 wt. percent nickel, based on the weight of the polymer) is colorless. When dyed with the dye having the formula shown in Example I, the film is dyed a deep shade of red-orange.

Poly(a,a-pentamethylenepropiolactone) may also be made dye receptive by the procedure of this example.

EXAMPLE IV

*Polypivalolactone modified with nickel 3-chlorobenzoate*

A sample of polypivalolactone prepared as described in Example I is mixed with nickel 3-chlorobenzoate (0.3 wt. percent nickel, based on the weight of the polymer). A film melt-pressed from the mixture is colorless. When dyed with the dye having the formula shown in Example I, the film is dyed a deep shade of red-orange. Fibers spun from the mixture can also be dyed with the chelatable dye.

EXAMPLE V

*Polypivalolactone modified with nickel anthranilate*

A sample of polypivalolactone prepared as described in Example I is mixed with nickel anthranilate (0.2 wt. percent nickel, based on the weight of the polymer). The polymer is then spun into yarn, drawn, and heat set in general accordance with the procedure described in Example I. The drawn yarn has a denier of 2.4 per filament. The heat-set yarn is white in color and has a tenacity of 3.9 g.p.d., a break elongation of 83%, an initial modulus of 24 g.p.d., and a work recovery at 5% elongation of 77%. Fabric woven from the heat-set yarn, when dyed with the dye having the formula shown in Example I, is dyed a deep shade of red-orange.

A film melt-pressed from polypivalolactone mixed with nickel anthranilate (0.3 wt. percent nickel, based on the weight of the polymer) is colorless. When dyed with the dye having the formula shown in Example I, the film is dyed a deep shade of red-orange.

For the purpose of comparison, the example is repeated, substituting nickel 3-aminobenzoate for nickel anthranilate as the polymer additive. When the melt-pressed film is dyed under the same conditions, it adsorbs relatively little of the dye; however, the dyebath changes from its initial yellow color to a red color, indicating that the nickel 3-aminobenzoate is leached from the film into the dyebath. The example is then repeated again, substituting nickel 4-aminobenzoate for nickel anthranilate. The resulting melt-pressed film adsorbs relatively little of the dye, and the nickel 4-aminobenzoate is leached from the film into the dyebath.

EXAMPLE VI

*Poly(α,α-diethylpropiolactone) modified with nickel 3,4-dichlorobenzoate*

To a refluxing mixture of 8 liters of ethyl acetate, 3 g. of dried $TiO_2$, and 1 g. of tetrabutylammonium hydroxide is added 1,026 g. of α,α-diethylpropiolactone. Refluxing is continued for 2.5 hours, after which the mixture is diluted with 8 liters of methanol and the precipitate is filtered, washed with methanol, and dried under vacuum. The product, poly(α,α-diethylpropiolactone), is obtained in a yield of more than 90% and has an inherent viscosity of 1.55 in trifluoroacetic acid at 30° C.

A sample of the polymer is mixed with nickel 3,4-dichlorobenzoate (0.15 wt. percent nickel, based on the weight of the polymer), and a filament of the mixture is extruded from a press spinner and quenched in cold water. The spinning speed is 366 meters per min. (400 y.p.m.). The filament is drawn 2.5× over a 175° C. plate. When dyed with the dye having the formula shown in Example I, the filament is dyed a deep shade of red-orange. A filament spun in the same way from a control sample of unmodified polymer is only tinted yellow.

To produce fibers and films of other colors, the above examples can be repeated with the substitution of other chelatable dyes i.e., colored organic substances containing two or more functional groups capable of forming chelate complexes with nickel and which otherwise display relatively little affinity for the polymer, for the dye having the formula shown in Example I. Thus, there may be employed the dye having the formula

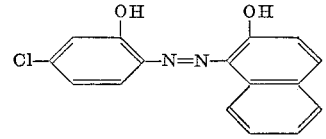

and prepared by diazotizing 2-hydroxy-4-chloroaniline followed by coupling with β-naphthol. This dye, when developed with a nickel salt, has a brown color. Suitable commercially available dyes chelatable with nickel salts which may be used include the dyes sold by the National Aniline Division of Allied Chemical and Dye Corp. and identified as "Polypropylene Brilliant Orange RM," "Polypropylene Brilliant Yellow GM," "Polypropylene Brilliant Blue BM," "Polypropylene Dark Blue 2BM," "Polypropylene Green BM," "Polypropylene Violet 3BRM," and "Polypropylene Violet 3RM".

EXAMPLE VII

*Thermal stability of polypivalolactone modified with nickel salts*

Polypivalolactone prepared as described in Example I is divided into a series of samples. To each is added one of the nickel salts shown in the table in the amount required to supply 0.3 wt. percent nickel, based on the weight of the polymer. A stainless steel mold having the dimensions 3.4 cm. x 7.0 cm. x 1.6 mm. (1.75″ x 2.75″ x 1/16″) is then filled with each mixture in turn and the mixtures are pressed in the mold for 10 minutes at 280° C., after which the molds are cooled. The colors of the resulting melt-pressed polymer sheets are listed in the table.

EXAMPLE VIII

*Comparative example: polypivalolactone modified with nickel acetate*

As a comparative example, polypivalolactone prepared as described in Example I is mixed with nickel acetate (0.1 wt. percent nickel, based on the weight of the polymer). The polymer is then spun into yarn, drawn, and heat set in general accordance with the procedure of Example I. The heat-set yarn is white and has a tenacity of 3.8 g.p.d., a break elongation of 64%, an initial modulus of 36 g.p.d., and a work recovery at 5% elongation of 88%. The heat-set yarn, when dyed with the dye having the formula shown in Example I, adsorbs relatively little of the dye; however, the dyebath changes from its initial yellow color to a red color, indicating that the nickel acetate is leached from the fibers into the dyebath.

TABLE.—COLOR OF MELT-PRESSED POLYMER SHEETS AFTER 10 MINUTES AT 280° C.

Salt added to polymer:                     Color of sheet
  *Nickel salts of the Invention*

Nickel 3-chlorobenzoate _____ slightly gray.
  Nickel 4-chlorobenzoate _____ light gray.
  Nickel 3,4 - dichlorobenzoate _____ light green.
  Nickel anthranilate _____ very slightly gray-green.

*Comparative tests using other nickel salts*

Nickel stearate _____ black.
  Nickel acetylacetonate _____ black.
  Nickel benzoate _____ deep gray.
  Nickel 4-fluorobenzoate _____ deep gray.

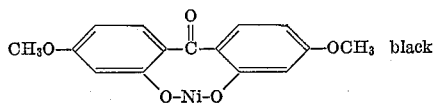 black

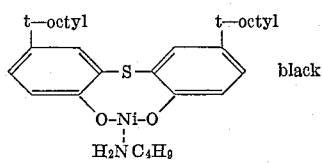 black

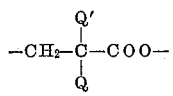

What is claimed is:

1. A dye receptive polymeric 2,2-disubstituted propiolactone of the fromula $$-CH_2-\underset{Q}{\overset{Q'}{C}}-COO-$$

wherein Q and Q' are selected from the group consisting of alkyl and chloroalkyl radicals of up to four carbon atoms which may be joined to form an alicyclic ring, said polymer containing between about 0.05 and 0.5 wt. percent nickel in the form of a nickel salt selected from the group consisting of nickel anthranilate, nickel 3-chlorobenzoate, nickel 4-chlorobenzoate, and nickel 3,4-dichlorobenzoate.

2. The composition of claim 1 in the form of a fiber.
3. The composition of claim 1 in the form of a film.
4. Polypivalolactone containing between about 0.05 and 0.5 wt. percent nickel in the form of nickel 3,4-dichlorobenzoate.
5. Polypivalolactone containing between about 0.05 and 0.5 wt. percent nickel in the form of nickel 4-chlorobenzoate.
6. Poly(α,α-diethylpropiolactone) containing between about 0.05 and 0.5 wt. percent nickel in the form of nickel 3,4-dichlorobenzoate.
7. Polypivalolactone containing between about 0.05 and 0.5 wt. percent nickel in the form of nickel anthranilate.
8. The composition of claim 6 in the form of a fiber.
9. The composition of claim 7 in the form of a fiber.

No references cited.

SAMUEL H. BLECH, *Primary Examiner.*

R. T. LYON, *Assistant Examiner.*